(12) United States Patent
Ruhland et al.

(10) Patent No.: US 9,956,973 B2
(45) Date of Patent: May 1, 2018

(54) SYSTEM, METHOD, AND APPARATUS FOR GENERATING VITAL MESSAGES ON AN ON-BOARD SYSTEM OF A VEHICLE

(71) Applicant: Westinghouse Air Brake Technologies Corporation, Wilmerding, PA (US)

(72) Inventors: Kristofer M. Ruhland, Cedar Rapids, IA (US); Kendrick W. Gawne, Cedar Rapids, IA (US); James L. Fenske, Marion, IA (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days. days.

(21) Appl. No.: 14/791,785

(22) Filed: Jul. 6, 2015

(65) Prior Publication Data
US 2016/0001801 A1    Jan. 7, 2016

Related U.S. Application Data

(60) Provisional application No. 62/021,346, filed on Jul. 7, 2014.

(51) Int. Cl.
*G06F 11/16* (2006.01)
*B61L 15/00* (2006.01)

(52) U.S. Cl.
CPC ....... *B61L 15/0018* (2013.01); *B61L 15/0027* (2013.01); *B61L 15/0036* (2013.01); *B61L 15/0063* (2013.01); *B61L 15/0072* (2013.01); *B61L 15/0081* (2013.01); *G06F 11/165* (2013.01); *G06F 11/167* (2013.01); *G06F 11/1641* (2013.01)

(58) Field of Classification Search
CPC ... G06F 11/1641; G06F 11/165; G06F 11/167
See application file for complete search history.

(56) References Cited

U.S. PATENT DOCUMENTS

| 4,740,972 | A | 4/1988 | Rutherford, Jr. | |
|---|---|---|---|---|
| 5,364,047 | A | 11/1994 | Petit et al. | |
| 8,015,390 | B1* | 9/2011 | Corcoran | G06F 11/1641 712/12 |
| 2010/0131741 | A1* | 5/2010 | Yamada | G06F 11/004 712/215 |
| 2011/0093767 | A1* | 4/2011 | Sharp | G06F 11/1004 714/807 |
| 2012/0260046 | A1* | 10/2012 | Lemonovich | G06F 15/17 711/147 |
| 2013/0268798 | A1* | 10/2013 | Schade | G06F 11/1487 714/3 |
| 2014/0074327 | A1* | 3/2014 | Weber | B61L 15/0063 701/19 |

* cited by examiner

*Primary Examiner* — Yolanda L Wilson
(74) *Attorney, Agent, or Firm* — The Webb Law Firm

(57) ABSTRACT

A system, method, and apparatus for generating vital messages on an on-board system of a vehicle is disclosed. The method includes generating a plurality of vital messages with each processor of a plurality of different processors of the on-board system based on train data available to each processor, transmitting the plurality of vital messages from the plurality of different processors to a separate processor, and generating, by the separate processor, a final vital message based on at least two vital messages of the plurality of vital messages. A system and an apparatus for implementing the aforementioned method includes appropriately communicatively connected hardware components.

27 Claims, 9 Drawing Sheets

SYSTEM, METHOD, AND APPARATUS FOR GENERATING VITAL MESSAGES ON AN ON-BOARD SYSTEM OF A VEHICLE

CROSS REFERENCE TO RELATED APPLICATION

This application claims benefit of priority from U.S. Provisional Patent Application No. 62/021,346, filed Jul. 7, 2014, which is incorporated by reference in its entirety.

BACKGROUND OF THE INVENTION

Field of the Invention

The present invention relates to generating vital messages and, in particular, a system, method, and apparatus for generating vital messages on an on-board system of a vehicle.

Description of Related Art

As is known in the art, many train systems and networks use some form of computer-controlled train management system, such as a Positive Train Control (PTC) system (e.g., the I-ETMS® of Wabtec Corporation). These computer-controlled train management systems have on-board computers or controllers that are used to implement certain train control and management actions for ensuring safe and effective operation of the train. In addition, such PTC systems include communication components for effecting direct or indirect communication between individual trains, e.g., an on-board computer, a train management computer, a PTC on-board component, or the like, and a centralized remote system, e.g., a back office server (BOS), a central dispatch system, another train management computer, or some other remote server or computer system. These communications are used to safely operate the train in a complex network, as controlled and managed by the BOS.

While some communications and messages between trains, or between a train and the back office server, are routine or "non-critical," many of the communications and messages are considered vital, critical, and/or "safety critical". Such communications and messages may include, without limitation, messages that assist in train routing and traffic control in the track network. In particular, and to support other PTC components, the PTC on-board component must be capable of transmitting or sending vital messages containing safety critical data. There remains a need for a solution that can demonstrate that multiple processors are contributing to the vital message, and that one processor is not doing all of the processing (or bypassing a validation step due to an internal failure), such that the failure of one processor to correctly build or generate the message does not result in a message being sent that contains incorrect data.

With respect to existing messaging logic, when the PTC on-board component sends a message, each CPU will build the message and attempt to send it. Due to the architecture of the system (e.g., three redundant, independent CPUs running in parallel with the intent that they are all producing the same outputs), only the message built by the primary CPU (e.g., the CPU responsible for control decisions among parallel processors) will be sent out from the PTC on-board component. This logic can create an unsafe scenario if the primary CPU is out of synchronization with the other CPUs, or if the primary CPU builds or generates the message with incorrect data. If the primary CPU is not in synchronization with the other CPUs, it may send a message that the other CPUs did not actually send (e.g., locomotive system state report), or it may send a message with different content than the other CPUs attempted to communicate. In existing systems, there is no coordination between the CPUs to ensure that multiple CPUs should be sending the same message, or that the message has been built with correct data. A schematic diagram of such existing messaging logic is illustrated in FIG. 1.

SUMMARY OF THE INVENTION

Generally, provided is a system, method, and apparatus for generating vital messages on an on-board system of a vehicle that overcomes some or all of the drawbacks of the prior art.

According to one preferred and non-limiting embodiment, provided is a computer-implemented method of generating vital messages on an on-board system of a vehicle, comprising: generating a plurality of vital messages with each processor of a plurality of different processors of the on-board system based on train data available to each processor; transmitting the plurality of vital messages from the plurality of different processors to a separate processor; and generating, by the separate processor, a final vital message based on at least two vital messages of the plurality of vital messages.

According to another preferred and non-limiting embodiment, provided is a system for generating vital messages on an on-board system of a vehicle, comprising: a plurality of processors arranged in the vehicle and configured to generate a plurality of vital messages, each processor of the plurality of processors configured to generate at least one vital message of the plurality of vital messages based at least partially on safety-critical data available to that processor; and at least one separate processor configured to generate a final vital message by combining at least two vital messages of the plurality of vital messages.

According to a further preferred and non-limiting embodiment, provided is an apparatus for generating vital messages on an on-board system of a vehicle, comprising at least one non-transitory computer-readable medium including program instructions that, when executed by the on-board system, cause the on-board system to: generate a plurality of vital messages with each processor of a plurality of different processors of the on-board system based on train data available to each processor; transmit the plurality of vital messages from the plurality of different processors to a separate processor; and generate, on the separate processor, a final vital message from at least two vital messages of the plurality of vital messages.

According to yet another preferred and non-limiting embodiment, provided is a computer-implemented method for generating a vital message on an on-board system of a vehicle, comprising: inserting an identifier into each message of a plurality of messages, wherein at least a first portion of each identifier uniquely identifies a processor of a plurality of processors that generated the message, and wherein at least a second portion of each identifier is identical among all identifiers; combining, with at least one processor, the plurality of messages into a final message comprising a combined identifier; determining, with at least one processor, if the combined identifier comprises the second portion of each identifier; and determining, with at least one processor, that the final message was generated based on at least two messages from at least two processors if the combined identifier comprises the second portion.

According to a further preferred and non-limiting embodiment, provided is a system for generating and validating a vital message, comprising: at least one non-transitory computer-readable medium including program instructions that, when executed by an on-board system of a vehicle, cause the on-board system to: receive a plurality of messages, each message of the plurality of messages comprising an identifier, wherein at least a first portion of each identifier uniquely identifies a processor of a plurality of processors that generated the message, and wherein at least a second portion of each identifier is identical among all identifiers; combine the plurality of messages into a final message comprising a combined identifier; at least one non-transitory computer-readable medium including program instructions that, when executed by a remote system, cause the remote system to: determine if the combined identifier comprises the second portion of each identifier; and determine that the final message was generated based on at least two messages from at least two processors if the combined identifier comprises the second portion.

A summary of the present invention is provided in the following numbered clauses:

Clause 1: computer-implemented method of generating vital messages on an on-board system of a vehicle, comprising: generating a plurality of vital messages with each processor of a plurality of different processors of the on-board system based on train data available to each processor; transmitting the plurality of vital messages from the plurality of different processors to a separate processor; and generating, by the separate processor, a final vital message based on at least two vital messages of the plurality of vital messages.

Clause 2: the computer-implemented method of clause 1, wherein generating the final vital message comprises combining the plurality of vital messages such that any invalid messages are filtered out.

Clause 3: the computer-implemented method of clause 2, wherein the plurality of vital messages comprises at least a first vital message, a second vital message, and a third vital message, and wherein combining the plurality of vital messages comprises: combining the first vital message with the second vital message using a first logical operator to generate a first binary string; combining the first vital message with the third vital message using the first logical operator to generate a second binary string; combining the second vital message with the third vital message with the first logical operator to generate a third binary string; and combining the first binary string, the second binary string, and the third binary string with a second logical operator.

Clause 4: the computer-implemented method of clause 3, wherein the first logical operator is an AND operator, and the second logical operator is an OR operator.

Clause 5: the computer-implemented method of any of clauses 1 to 4, further comprising: determining that the final vital message is valid if the final vital message matches at least two vital messages of the plurality of vital messages; and transmitting the final vital message to a remote system if the final vital message is determined to be valid.

Clause 6: the computer-implemented method of any of clauses 1 to 5, further comprising: transmitting the final vital message to a remote system; and determining, at the remote system, that the final vital message is valid based at least partially on a CRC.

Clause 7: the computer-implemented method of any of clauses 1 to 6, further comprising: adding a binary string to each vital message of the plurality of vital messages, wherein each binary string uniquely identifies the processor that generated the vital message, and wherein each binary string has at least one bit that is the same in every binary string of a plurality of binary strings; and determining if the final vital message is valid by combining the plurality of binary strings to generate a combined identifier, such that the final vital message is valid if the combined identifier comprises the at least one bit.

Clause 8: the computer-implemented method of clause 7, further comprising determining if the combined identifier comprises the at least one bit by comparing the combined identifier to a predetermined value.

Clause 9: a system for generating vital messages on an on-board system of a vehicle, comprising: a plurality of processors arranged in the vehicle and configured to generate a plurality of vital messages, each processor of the plurality of processors configured to generate at least one vital message of the plurality of vital messages based at least partially on safety-critical data available to that processor; and at least one separate processor configured to generate a final vital message by combining at least two vital messages of the plurality of vital messages Clause 10: the system of clause 9, wherein the plurality of vital messages comprises at least a first vital message, a second vital message, and a third vital message, and wherein the separate processor is configured to determine the match between at least two vital messages by: combining the first vital message with the second vital message using a first logical operator to generate a first binary string; combining the first vital message with the third vital message using the first logical operator to generate a second binary string; combining the second vital message with the third vital message using the first logical operator to generate a third binary string; and combining the first binary string, the second binary string, and the third binary string using a second logical operator to generate a final binary string.

Clause 11: the system of clause 10, wherein the first logical operator is an AND operator, and the second logical operator is an OR operator.

Clause 12: the system of clauses 10 or 11, wherein each vital message of the plurality of vital messages comprises a binary string that uniquely identifies the processor that generated the vital message, wherein each binary string for the plurality of vital messages comprises at least one bit that is the same in every binary string of the plurality of binary strings, and wherein the at least one separate processor is configured to combine the plurality of binary strings to generate a combined identifier, such that the final vital message can be validated by determining if the combined identifier comprises the at least one bit.

Clause 13: the system of clause 12, wherein the combined identifier is determined to comprise the at least one bit based on a comparison between the combined identifier and a predetermined value.

Clause 14: an apparatus for generating vital messages on an on-board system of a vehicle, comprising at least one non-transitory computer-readable medium including program instructions that, when executed by the on-board system, cause the on-board system to: generate a plurality of vital messages with each processor of a plurality of different processors of the on-board system based on train data available to each processor; transmit the plurality of vital messages from the plurality of different processors to a separate processor; and generate, on the separate processor, a final vital message from at least two vital messages of the plurality of vital messages.

Clause 15: the apparatus of clause 14, wherein the on-board system generates the final vital message by combining the plurality of vital messages such that invalid messages are filtered out or detectable as invalid.

Clause 16: the apparatus of clause 15, wherein the plurality of vital messages comprises a first vital message, a second vital message, and a third vital message, and wherein combining the plurality of vital messages comprises: combining the first vital message with the second vital message with a first logical operator to generate a first binary string; combining the first vital message with the third vital message with the first logical operator to generate a second binary string; combining the second vital message with the third vital message with the first logical operator to generate a third binary string; and combining the first binary string, the second binary string, and the third binary string with a second logical operator.

Clause 17: the apparatus of clause 16, wherein the first logical operator is an AND operator, and the second logical operator is an OR operator.

Clause 18: the apparatus of any of clauses 14-17, wherein the on-board system is further caused to: determine that the final vital message is valid if the final vital message matches at least two vital messages of the plurality of vital messages; and transmit the final vital message to a remote system if the final vital message is determined to be valid.

Clause 19: the apparatus of any of clauses 14-18, wherein the on-board system is further caused to: transmit the final vital message to a remote system, such that the remote system can determine that the final vital message is valid or invalid based on a CRC.

Clause 20: the apparatus of any of clauses 14-19, wherein the on-board system is further caused to: add, to each vital message of the plurality of vital messages, a binary string of a plurality of binary strings, wherein each binary string of the plurality of binary strings uniquely identifies the processor that generated the vital message, and wherein each binary string has at least one bit that is the same in every binary string of the plurality of binary strings; and combine the plurality of binary strings to generate a combined identifier, such that the final vital message can be validated by determining if the combined identifier comprises the at least one bit.

Clause 21: the apparatus of clause 20, wherein a remote system determines if the combined identifier comprises the at least one bit by comparing the combined identifier to a predetermined value.

Clause 22: the apparatus of any of clauses 14-21, wherein the plurality of messages comprises variable message fields, and wherein the on-board system is further caused to: exchange variable field data among the plurality of different processors, wherein each vital message of the plurality of vital messages is generated based at least partially on the variable field data.

Clause 23: a computer-implemented method for generating a vital message on an on-board system of a vehicle, comprising: inserting an identifier into each message of a plurality of messages, wherein at least a first portion of each identifier uniquely identifies a processor of a plurality of processors that generated the message, and wherein at least a second portion of each identifier is identical among all identifiers; combining, with at least one processor, the plurality of messages into a final message comprising a combined identifier; determining, with at least one processor, if the combined identifier comprises the second portion of each identifier; and determining, with at least one processor, that the final message was generated based on at least two messages from at least two processors if the combined identifier comprises the second portion.

Clause 24: the computer-implemented method of clause 23, wherein each message comprises a binary string, and wherein determining if the combined identifier comprises the second portion comprises determining if the first portion of the final identifier comprises 0-bits and if the second portion of the final identifier comprises 1-bits.

Clause 25: the computer-implemented method of clauses 23 or 24, wherein each message comprises a binary string, and wherein combining the plurality of messages with the at least one logical operator comprises: combining each message and each other message with an AND operation, resulting in at least two results; and combining the at least two results with an OR operation.

Clause 26: the computer-implemented method of clause 25, further comprising determining if the final vital message is valid by comparing the final vital message to each message such that, if at least two messages of the plurality of messages match the final vital message, the final vital message is determined to be valid.

Clause 27: a system for generating and validating a vital message, comprising: at least one non-transitory computer-readable medium including program instructions that, when executed by an on-board system of a vehicle, cause the on-board system to: receive a plurality of messages, each message of the plurality of messages comprising an identifier, wherein at least a first portion of each identifier uniquely identifies a processor of a plurality of processors that generated the message, and wherein at least a second portion of each identifier is identical among all identifiers; combine the plurality of messages into a final message comprising a combined identifier; at least one non-transitory computer-readable medium including program instructions that, when executed by a remote system, cause the remote system to: determine if the combined identifier comprises the second portion of each identifier; and determine that the final message was generated based on at least two messages from at least two processors if the combined identifier comprises the second portion.

Clause 28: the system of clause 27, wherein each message comprises a binary string, and wherein determining if the combined identifier comprises the second portion comprises determining if the first portion of the final identifier comprises 0-bits and if the second portion of the final identifier comprises 1-bits.

Clause 29: the system of clauses 27 or 28, wherein each message comprises a binary string, and wherein the plurality of messages are combined by: combining each message and each other message with an AND operation, resulting in at least two results; and combining the at least two results with an OR operation.

Clause 30: the system of any of clauses 27-29, wherein the remote system is further caused to determine if the final vital message is valid by comparing the final vital message to each message such that, if at least two messages of the plurality of messages match the final vital message, the final vital message is determined to be valid.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DESCRIPTION OF THE PREFERRED EMBODIMENTS

Figure 1:
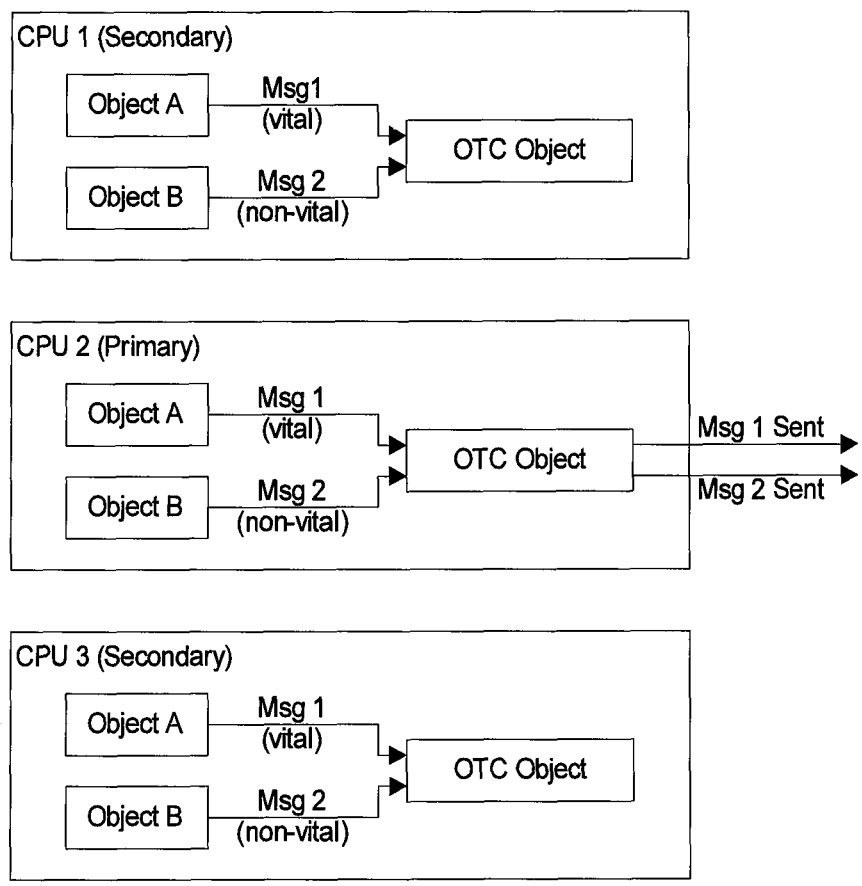
FIG. 1 illustrates a schematic diagram of a messaging system according to the prior art.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

As used herein, the terms "communication" and "communicate" refer to the receipt, transmission, or transfer of one or more signals, messages, commands, or other type of data. For one unit or device to be in communication with another unit or device means that the one unit or device is able to receive data from and/or transmit data to the other unit or device. A communication may use a direct or indirect connection, and may be wired and/or wireless in nature. Additionally, two units or devices may be in communication with each other even though the data transmitted may be modified, processed, routed, etc., between the first and second unit or device. It will be appreciated that numerous arrangements are possible. Any known electronic communication protocols and/or algorithms may be used such as, for example, TCP/IP (including HTTP and other protocols), WLAN (including 802.11 and other radio frequency-based protocols and methods), analog transmissions, Global System for Mobile Communications (GSM), and/or the like.

In a preferred and non-limiting embodiment of the present invention, provided is a system, method, and apparatus for generating vital messages on an on-board system of a rail vehicle, including safety-critical data concerning the rail vehicle and/or the railroad. As used herein, the term "on-board system" refers to any computer-controlled train management system or portion thereof, including but not limited to a Positive Train Control (PTC) system (e.g., the I-ETMS® of Wabtec Corporation) or any other on-board computers or controllers that are used to implement train control and management functions for ensuring safe and effective operation of the rail vehicle and/or communicating between individual vehicles and/or a remote system. As used herein, the term "remote system" may refer to any computing device that is remote from the on-board system such as, but not limited to, a BOS, a central dispatch system, a different train management computer, a web server, a mobile device, and/or the like. It will be appreciated by those skilled in the art that the system, apparatus, and method may be used with various other types of vehicles. Moreover, the system, apparatus, and method described herein may also be used in any other context or environment in which it is desirable to generate vital messages.

The on-board system includes multiple processors, including a primary processor and one or more secondary processors, which each build messages and generate message data for transmission to a remote system. As used herein, the term "message data" refers to any data including one or more vital or non-vital messages, or portions of such messages, and can include various other information such as, but not limited to, various identifiers, headers, checksums, cyclic redundancy check (CRC) data, and/or the like. A separate processor receives the message data from the primary and secondary processors and, based on these input messages, generates a final vital message for transmission to the remote system. As used herein, the term "processor" may refer to a CPU, microprocessor, controller, or any other type of computing device, and may also refer to a device, system, or system component that includes one or more computing devices. In a preferred and non-limiting embodiment, the processors are part of an on-board system for a rail vehicle that includes a plurality of hardware and software components, including multiple processors that perform tasks for all or part of the system.

Figure 2:
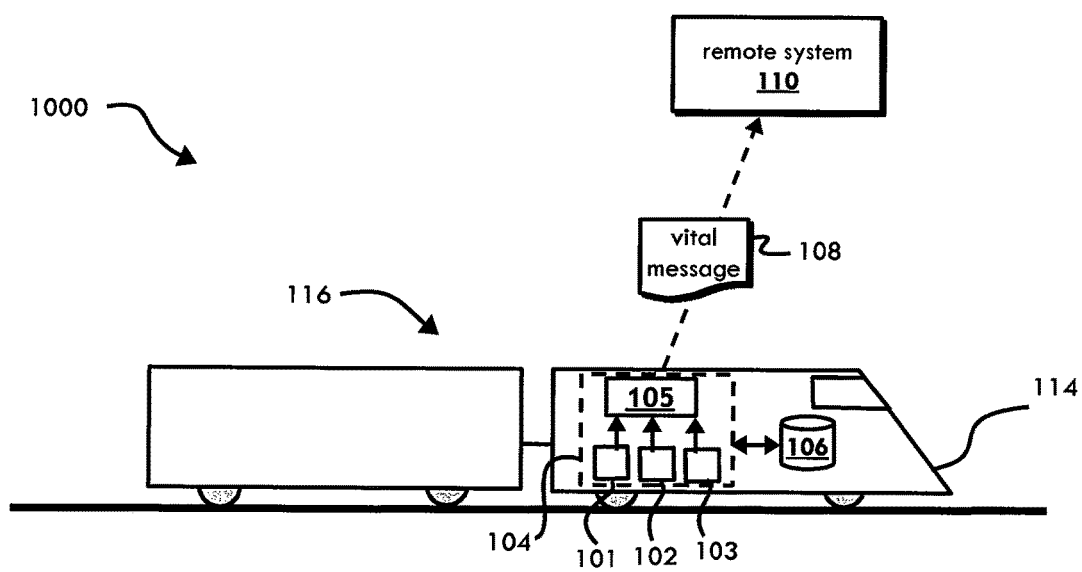
FIG. 2 illustrates a schematic diagram of an embodiment of a system for generating vital messages on an on-board system of a rail vehicle according to the principles of the present invention.

Referring now to FIG. 2, a system 1000 for generating vital messages is shown according to a preferred and non-limiting embodiment. A rail vehicle 116 including a locomotive 114 is shown in FIG. 2. An on-board system 104 on the rail vehicle 116 includes multiple processors 101, 102, 103. The on-board system 104 may also include various hardware and/or software components such as, for example, memory, storage devices, input devices, network adapters, and/or the like. The rail vehicle 116 also includes train data 106 that is generated on the rail vehicle 116 and/or received from devices on or external to the rail vehicle 116. The processors 101, 102, 103 generate message data from the train data 106 and from other sources, including safety-critical data. It will be appreciated that numerous other arrangements are possible. For example, processors 101, 102, 103 may be distributed throughout the train 116 including, but not limited to, as part of an end-of-train (EOT) unit, a head-of-train (HOT) unit, and/or any other computing device on the train 116.

With continued reference to FIG. 2, a separate processor 105 receives message data from the other processors 101, 102, 103 and, based on this data, generates a final vital message 108. In a preferred and non-limiting embodiment, the final vital message 108 is generated for each message that is received from all of the processors 101, 102, 103. The final vital message 108 may be the result of combining the messages from the other processors 101, 102, 103, and may additionally include other information and data that is added after the messages are combined. The separate processor 105 may then determine if the final vital message 108 is valid, and communicate the final vital message 108 to a remote system 110. The separate processor 105 may also communicate the final vital message 108 to a remote system 110 and allow the remote system 110 to determine the validity of the final vital message 108.

Figure 3:
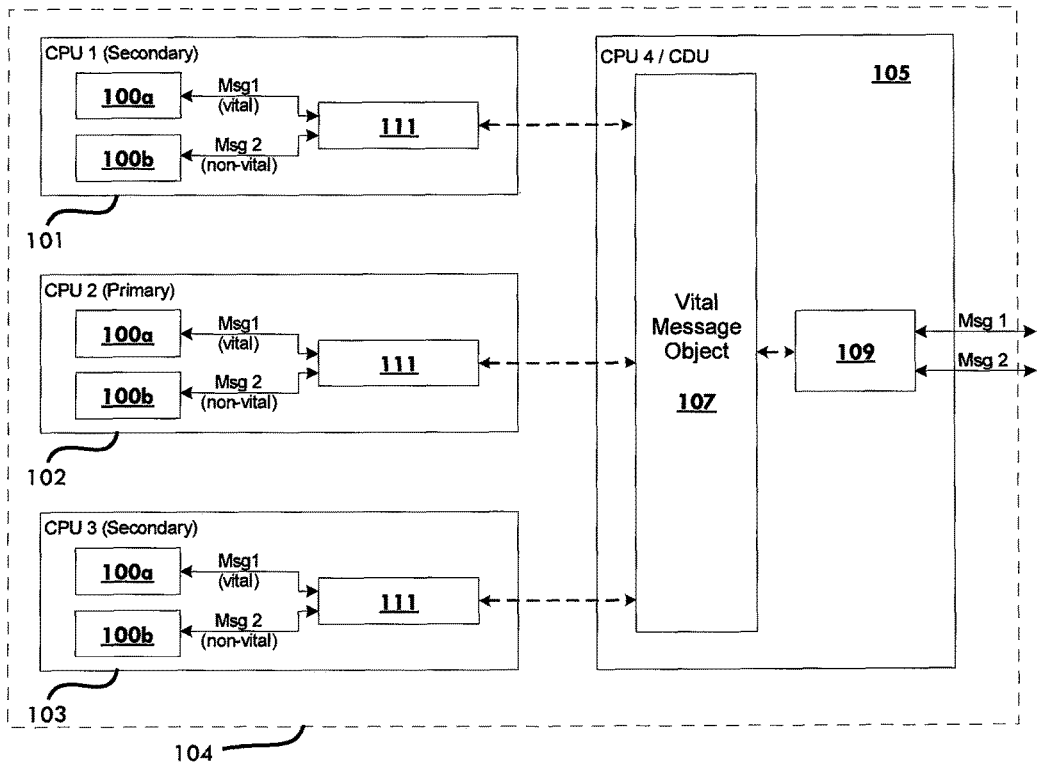
FIG. 3 illustrates a schematic diagram of an embodiment of a rail vehicle on-board system configured to generate vital messages according to the principles of the present invention.

Referring now to FIG. 3, an on-board system 104 configured to generate vital messages is shown according to a preferred and non-limiting embodiment. A primary processor 102 and two secondary processors 101, 103 generate message data. The primary processor 102 includes or is in communication with an off-train communication (OTC) object 111 that receives vital and non-vital messages from a first object 100a and a second object 100b, respectively. Likewise, secondary processors 101, 103 each include or are in communication with an OTC object 111 that is executed by those processors and receives, as inputs, vital and non-vital messages from the first object 100a and the second object 100b. A separate processor 105 receives messages from each of the processors 101, 102, 103 and, in particular, the OTC object 111 executed by each processor. As used herein, the term "object" may refer to any hardware and/or software component or module such as, but not limited to, an executable software program, a function call within a software program, a data structure, a set of defined variables and/or functions, or the like. It will be appreciated that numerous other arrangements are possible, and that various programming choices and methods are contemplated for generating and exchanging message data.

With continued reference to FIG. 3, a separate processor 105 executes a vital message object 107 and a vital OTC object 109. The separate processor may include a CPU or a cab display unit, as examples. Each processor 101, 102, 103 may be in communication with the separate processor 105 via a TCP connection or other like communication protocol. The connection between processors may be direct or, in other examples, the connection between processors 101, 102, 103 and processor 105 may be maintained via a dedicated bridge object. It will be appreciated that various other communication arrangements are possible. The separate processor 105 combines the messages it receives according to one or more algorithms to construct a final vital message, determines the validity of the final vital message, and communicates the final vital message to a remote system.

Still referring to FIG. 3, the separate processor 105 constructs the final vital message from raw message data received from multiple sources (e.g., processors 101, 102, 103). These sources may be selected (or "voted-in") based on various considerations such as, for example, if the processor is known to be out of synchronization or otherwise prone to error. Selected sources are not required for a message to be sent vitally, but the use of a selecting or voting-in process increases the confidence in valid messages being sent from the on-board system 104. This arrangement also allows for messages to be received from secondary processors 101, 103 in the event that the primary processor 102 is voted-out or otherwise not selected but is still identified as the primary processor 102.

Figure 4:
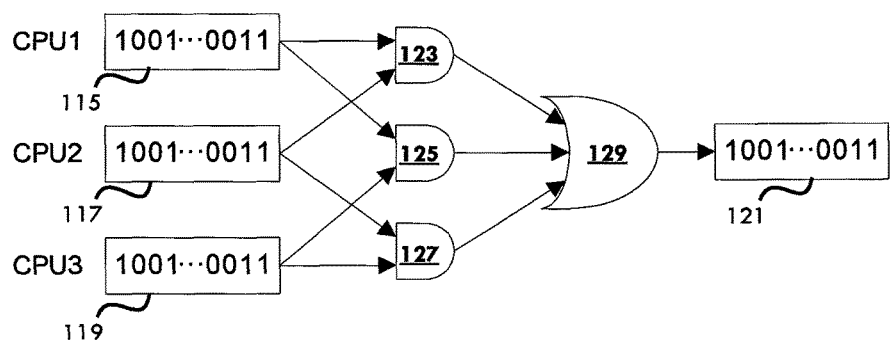
FIG. 4 illustrates a logic diagram for an embodiment of a system, method, and apparatus for generating vital messages on an on-board system of a rail vehicle according to the principles of the present invention.

Referring now to FIG. 4, a logic diagram is shown for generating vital messages according to a preferred and non-limiting embodiment. A first vital message 115, second vital message 117, and third vital message 119 are inputs into logical operations 123, 125, 127, 129 that result in a single binary output 121. In the example illustrated in FIG. 4, the first vital message 115 and the second vital message 117 are compared via a logical AND operation 123. Using an AND operation, each corresponding binary digit (bit) of the first message 115 and second message 117 are combined such that, if either of the bits is a zero (0), the resulting digit bit is a zero (0) and, if both bits are a one (1), the resulting bit is a one (1). Accordingly, the operation 123 takes two binary inputs and outputs a single binary string. The first vital message 115 and the third vital message 119 are combined by another AND operation 125, and the second message 117 and third message 119 are also combined by an AND operation 127.

With continued reference to FIG. 4, the results of logical operations 123, 125, 127 are input into a subsequent logical operation 129. In the depicted example, the logical operation 129 is an OR operation. Using an OR operation, if either of the bits is a one (1), the resulting bit is a one (1) and, if both bits are a zero (0), the resulting bit is a zero (0). In the illustrated example, three binary inputs result in a single binary output 121. The single binary output 121 is used as the final vital message, although additional operations may be performed and other data may be added to construct the final vital message that is communicated. It will be appreciated that other logical operations, bitwise operators, and arrangements are possible for generating a final vital message from multiple messages.

The logic shown in FIG. 4 filters out invalid message data from one or more processors 101, 102, 103 if the message data received from other processors match. If the final binary string 121 (e.g., final vital message) matches at least two of the input messages 115, 117, 119, the final vital message is determined to be valid. On the other hand, if the final binary string 121 does not match any of the input messages 115, 117, 119, or only matches one input message, it can be determined that an error occurred and that the final binary string 121 or final vital message could be invalid. An invalid vital message may be discarded rather than communicated to the remote system.

In a preferred and non-limiting embodiment, and with reference to FIG. 3, if a message is not received from one of the processors 101, 102, 103, a binary string of zeros (0) may be used so as to not affect the result of the logical operations. This permits the separate processor 105 to generate a message without having to choose a source processor to use as the message source. If only two processors are available and the messages differ, or if the messages from all processors 101, 102, 103 differ, the output is determined to be invalid. In these circumstances, rules may control how the system operates. For example, if message data is not received from at least two selected processors, no final vital message may be communicated to the remote system. In this example, the received message data will eventually time-out of temporary storage and be deleted to make room for incoming message data. The output of one or more logical operations may be processed by a vital OTC object 109 (shown in FIG. 3) that packages the message according to a specified protocol and communicates the message using any number of methods. The combination of message data from multiple sources into a final message through the use of one or more logical operations allows for message data to be combined without the separate processor 105 being aware of the structure of the message.

Figure 5:
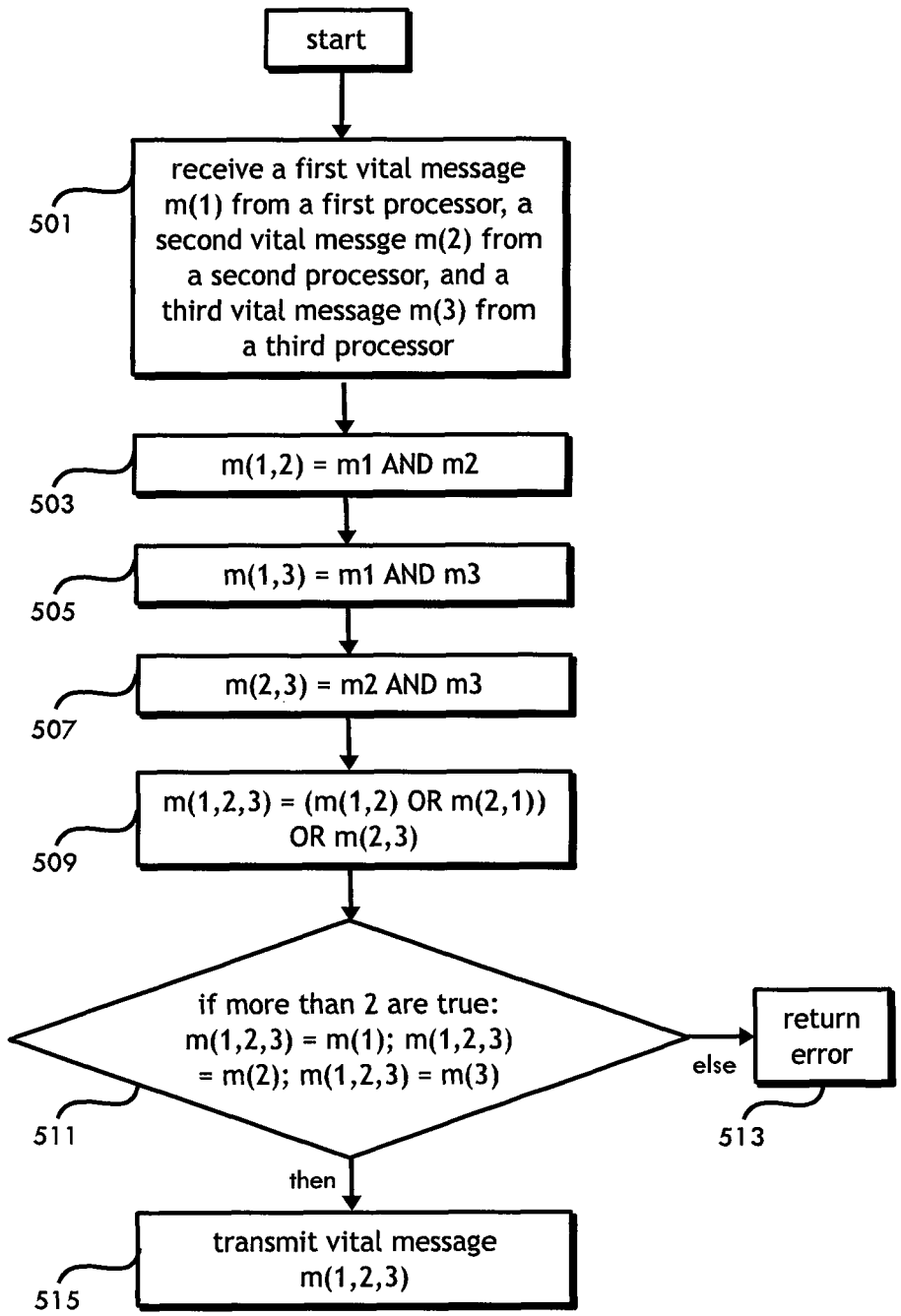
FIG. 5 illustrates a flow diagram for an embodiment of a system, method, and apparatus for generating vital messages on an on-board system of a rail vehicle according to the principles of the present invention.

Referring now to FIG. 5, a flow diagram for generating vital messages is shown according to a preferred and non-limiting embodiment. At a first step 501, a plurality of messages is received from a plurality of processors. For the purpose of example, the flow diagram in FIG. 5 uses three messages from three processors. However, it will be appreciated that any number of messages and processors may be used. The messages received in this example are m(1), m(2), and m(3). In the next step 503, m(1,2) is calculated as the result of a logical AND operation between m(1) and m(2). The result m(1,2) will be the same length as each of m(1) and m(2). In the next step 505, m(1,3) is calculated as the result of a logical AND operation of m(1) and m(3). Likewise, in step 507, m(2,3) is calculated as the result of a logical AND operation of m(2) and m(3). It will be appreciated that this process may be continued such that each received message is combined with each of the other received messages, for any number of message sources.

With continued reference to FIG. 5, once the results m(1,2), m(1,3), and m(2,3) are calculated, the results are then combined at step 509 to result in a final vital message m(1,2,3). In the example shown, step 509 involves the combination of m(1,2), m(1,3), and m(2,3) with a logical OR operation. This may be done by first combining m(1,2) and m(1,3), and then combining the result with m(2,3). However, it will be appreciated that such calculations can be performed in various orders. At this point, the method may proceed directly to step 515 such that the final vital message m(1,2,3) is communicated to a remote system. The remote system can then validate the final vital message using the CRC or through other methods. Alternatively, after the final vital message m(1,2,3) is generated, at step 511 it may be determined whether two or more of the original messages (m(1), m(2), or m(3)) match the final vital message (m(1,2,3)). If at least two messages match, the method proceeds to step 515 and the final message m(1,2,3) is communicated to the remote system. Otherwise, if at least two of the messages do not match the final message, it is determined that the final message m(1,2,3) is invalid or is otherwise erroneous at step 513. Those skilled in the art will appreciate that additional and/or fewer steps may be performed.

According to a preferred and non-limiting embodiment, identifiers are added to the message data generated by each processor to uniquely identify that processor. The identifiers are added by each processor that generates the message and allow for the system to determine that the final message is generated based on message data from at least two processors. The identifier may be one byte that is added as the first byte in any final message. However, it will be appreciated that the identifier may be any length and may be incorporated into message data in various other ways. In a preferred and non-limiting embodiment, the identifier is generated by each processor that generates message data.

The value of the identifier may be based on the location of the processor on the backplane of the train management computer, as an example, although any method of generating unique identifiers may be used. Each identifier is unique to each processor and is constructed such that, when processed according to the logic described herein for generating a final vital message, the system can determine whether the final message was generated based on message data from multiple processors. The final identifier that results from logical operations performed on each message (and thereby each identifier) may be non-zero to prevent false positives. The final identifier resulting from the logical operations can then be compared to a predetermined value by the remote system to determine if the final message data is valid. Because the identifiers are generated by the processors that create the message data, the separate processor 105 and/or vital message object 107 (shown in FIG. 3) is unaware of such constructs and is therefore unlikely to insert a value on its own.

Figure 6:
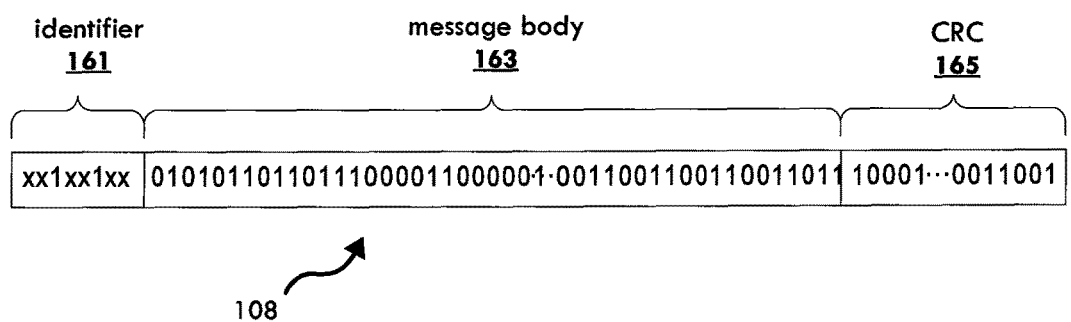
FIG. 6 illustrates an embodiment of a vital message according to the principles of the present invention.

Referring now to FIG. 6, a final vital message 108 is shown according to a preferred and non-limiting embodiment. The final vital message 108 includes an identifier portion 161, a message body portion 163, and a cyclic redundancy check (CRC) portion 165. One or more bits of the identifier 161 may be static across all processors of a given system. For example, as shown in FIG. 6, the third bit and the sixth bit have the value of "1". The remainder of the identifier portion 161 is variable and can differ among processors to uniquely identify a single source processor. The message body portion may include data representing any type of message, destination information including a network address and/or destination identifier, a message identifier that uniquely identifies the message, header data, and/or any other like information.

Figure 7:
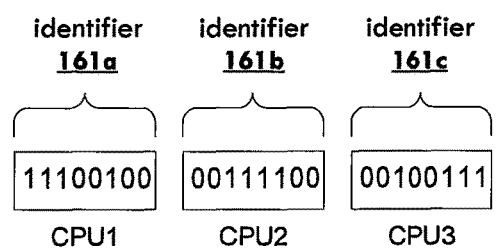
FIG. 7 illustrates embodiments of identifiers that uniquely identify a processor according to the principles of the present invention.

Referring now to FIG. 7, three different identifiers 161a, 161b, 161c are shown for three different processors (e.g., CPU1, CPU2, and CPU3). As shown in FIG. 7, each identifier 161a, 161b, 161c has a "1" as the third bit and the sixth bit. The remaining bits of the identifiers 161a, 161b, 161c uniquely identify a processor. Accordingly, if identifier 161a and 161b are combined with an AND operation (e.g., 11100100 AND 00111100=00100100), all bits of the resulting identifier will be a zero (0) except for the third and sixth bits. Likewise, if the result of combining identifier 161a and identifier 161b is then combined with identifier 161c, all of the "1" bits result in a zero (0) except for the third and sixth bits (i.e., 00100100).

With continued reference to FIG. 7, "00100100" is a predefined string and, if the result of combining the identifiers does not equal this string, the message(s) can be discarded by the remote system due to a miscalculation or corruption of the data. For example, if identifier 161b is changed to "01011100", its combination with identifier 161a would result in "01000100", and its combination with identifier 161c would result in "00100100". The combination of identifiers 161a and 161c would be "00100100", and the result of combining all of the results with an OR operation would be "01100100". Since this value does not match with a predetermined value of "00100100", it can be determined that the data is invalid or corrupt. It will be appreciated by those skilled in the art that various types of identifiers may be used and that other algorithms may be employed for combining the identifiers.

In a preferred and non-limiting embodiment, and as shown in FIG. 6, a CRC 165 may be added to a final vital message 108. The CRC 165 is calculated based on the message body 163, not including the identifier portion 161. The CRC 165 can therefore be used as a secondary source to validate the vital message 108, and will be subjected to the same logical operations as the rest of the message 108. Using a CRC 165 for each input message will combine the CRCs together through logical operations performed on the message. If multiple messages are combined incorrectly or using non-matching message data, the resulting CRC will not validate over the contents of the messages. By validating both the identifier 161 and the CRC 165, the remote system can be confident that the final vital message is both valid and vital.

In a preferred and non-limiting embodiment, non-vital message data may be added after the final vital message has been compiled. For example, an Edge Message Protocol (EMP) header and an integrity value are non-vital and may be added by the separate processor 105 (shown in FIG. 3) once the final vital message 108 is generated. Since the value of the message identifiers would be altered from the logical operations performed on the messages, the system may not generate non-vital message data in advance. Accordingly, a separate message identifier and/or a message version number may be included in the message body to provide increased confidence that the non-vital message data is valid because it can be determined if the separate message identifier and/or version number in the header match those in the body of the message. Non-vital message data may also be included in the CRC.

Figure 8A:
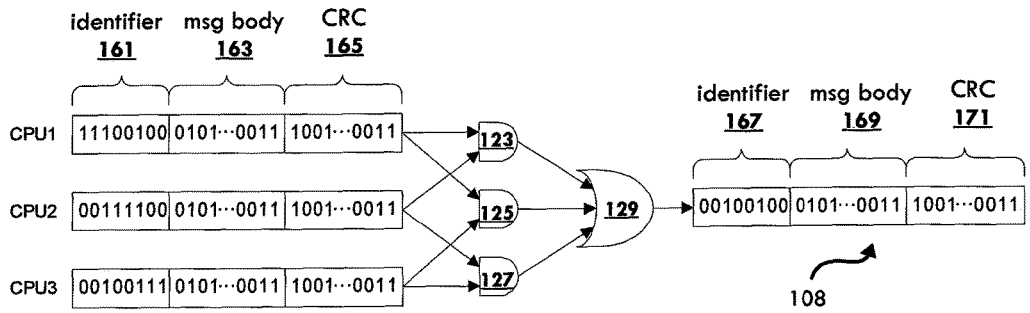
FIG. 8A illustrates a logic diagram for an embodiment of a system, method, and apparatus for generating vital messages on an on-board system of a rail vehicle according to the principles of the present invention.
Figure 8B:
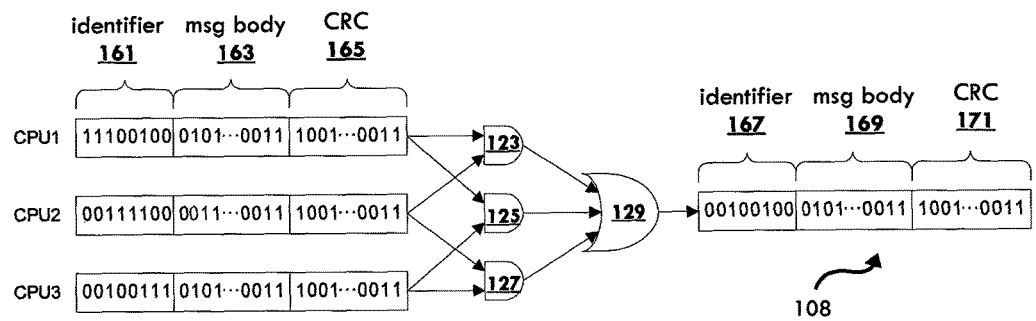
FIG. 8B illustrates a logic diagram for an embodiment of a system, method, and apparatus for generating vital messages on an on-board system of a rail vehicle according to the principles of the present invention.
Figure 8C:
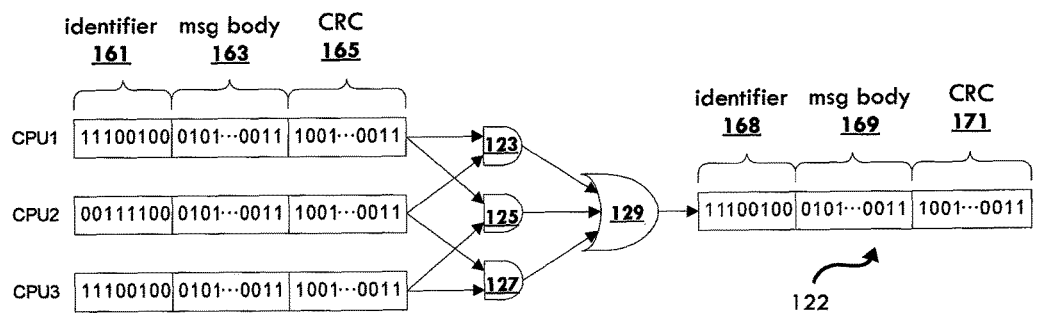
FIG. 8C illustrates a logic diagram for an embodiment of a system, method, and apparatus for generating vital messages on an on-board system of a rail vehicle according to the principles of the present invention.

Referring now to FIGS. 8A-C, final vital messages 108 are shown according to various sets of message data. FIG. 8A shows a valid final vital message 108 in which the message body 163 for each message received from a processor match, such that the final vital message is a combination of data from all processors. FIG. 8B shows a valid final vital message 108 generated based only on message data received from two of the three processors. In this example, it can be seen that the message body portion 163 of the message data from CPU2 is different than the message body portion 163 of the message data from CPU1 and CPU3. Accordingly, the message data from CPU2 is filtered out after being processed with the logical operations 123, 127, 129. FIG. 8C shows an invalid final vital message 122 generated based on message data received from three processors. This message 122 includes a final identifier 168 that does not match a predetermined value (e.g., 00100100) that would indicate a valid final identifier 167.

In a preferred and non-limiting embodiment, the separate processor 105 (shown in FIG. 3) may need to queue messages rapidly (e.g., several messages per second), and implement time constraints to determine how long to wait for the message data from the other processors 101, 102, 103 (also shown in FIG. 3) before combining them. Determining how much memory is needed may be dependent on knowing which messages are vital and which are non-vital. Once this is determined, the memory requirements can be determined by the following formula: $(M*I*T*n+y)*S$, where M is the number of vital messages, I is the number of instances of a vital message that must be processed (e.g., the number of destinations that the message can be sent to at one time), T is the time that the message must remain in queue prior to being removed, n is the number of processors that generated a message (e.g., three (3) in the example discussed above), y represents the processing power needed to carry out the logical operations (e.g., four (4) in the example discussed below if the logical operations involve three (3) AND operations and one (1) OR operation), and where S is the size of the largest vital message. It will be appreciated that various other formulae may be used to determine how much memory is necessary, and various other parameters may be taken into consideration.

With reference to FIG. 3, in a preferred and non-limiting embodiment, the message data from the various processors 101, 102, 103 are correlated such that the separate processor 105 generating the final vital message 108 knows which messages need to be combined. For example, the same message identifier may be sent to multiple destinations with varying message content. Moreover, the processors 101, 102, 103 may also send message data in different orders than one another. Accordingly, a correlation identifier (e.g., an EMP message number) may not be sufficient to correlate the messages between the various processors 101, 102, 103. Additional attributes may therefore be used to correlate messages between processors 101, 102, 103 such as a message identifier, a destination address, and/or a linking number. A linking number is a value internal to the on-board system 104 and, in one example, is internal to a PTC on-board component. The linking number may be used just for correlating messages and may be unique within a single message identifier. The linking number may then be periodically synchronized between the processors.

Figure 9A:
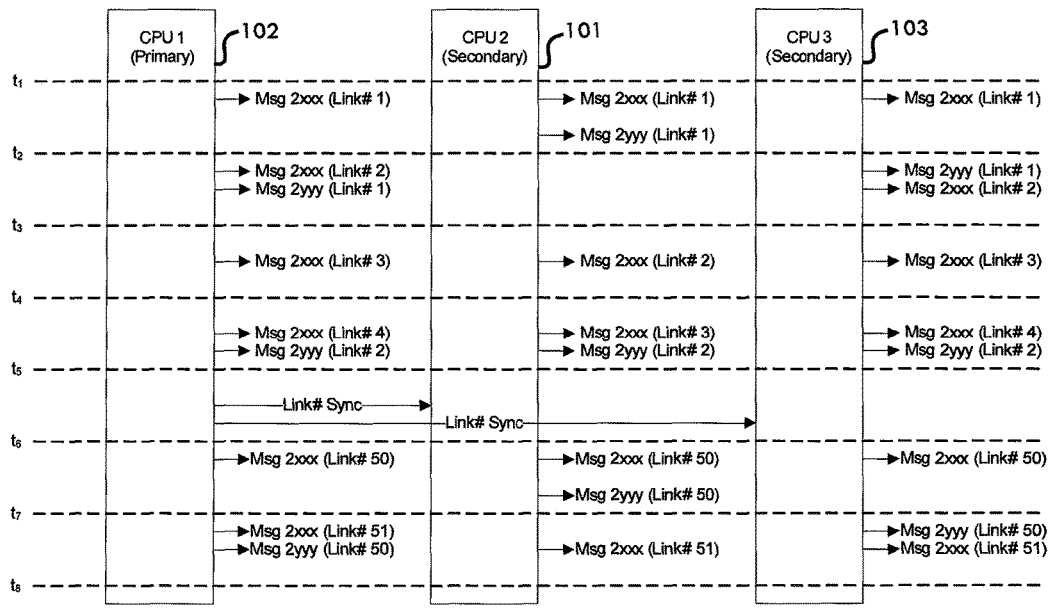
FIG. 9A illustrates a flow diagram for an embodiment of a system, method, and apparatus for correlating messages according to the principles of the present invention.

Referring now to FIG. 9A, a diagram is shown for synchronizing linking numbers according to a preferred and non-limiting embodiment. As shown, processors 101, 102, 103 output messages ("Msg") identified by a message identifier (e.g., "2xxx" and "2yyy"). The link number is incremented for each message having a message identifier that was associated with a previous message. To synchronize the processors 101, 102, 103, a new link number is shared by the primary processor 102 to secondary processors 101, 103. In the example shown, a higher link number (50) is used to ensure that a link number is not used that has already been used by one of the processors 101, 102, 103. It will be appreciated that the new link number used for synchronization may be determined in any number of ways.

Figure 9B:
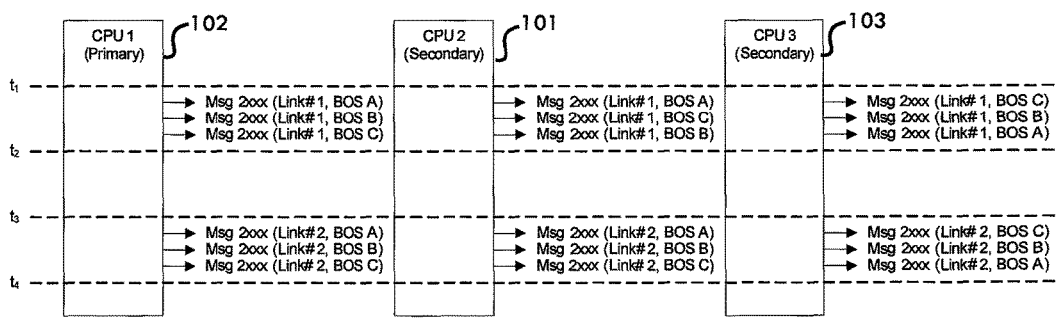
FIG. 9B illustrates another flow diagram for an embodiment of a system, method, and apparatus for correlating messages according to the principles of the present invention.

Referring now to FIG. 9B, a diagram is shown for synchronizing linking numbers according to another non-limiting embodiment. In this example, the same linking number is used for duplicate messages sent to multiple destination addresses. The destination addresses are used in this non-limiting embodiment to correlate the messages from different processors. For example, if the destination addresses (e.g., BOS A, BOS B, BOS C, etc.) are different among messages having the same message identifiers, the link number is not incremented. The link number is incremented for subsequent messages having the same message identifier and destination address as a previous message sent by that processor. This functionality allows for more efficient correlation in a scenario where the order of destination addresses differ among the various processors.

In a preferred and non-limiting embodiment, non-vital message data is also processed by the separate processor that generates the final vital message. Implementation of the system may make it more desirable, or necessary, to handle non-vital messages through the arrangement that processes vital messages. With reference to FIG. 3, the vital message object 107 may receive non-vital message data from the processors 101, 102, 103. The vital message object 107 may not require that non-vital message data be received from multiple source processors. Non-vital message data may be handled in various ways. In one non-limiting embodiment, only non-vital message data generated by a primary processor 102 is used and transmitted, and non-vital message data received from secondary processors 101, 103 is ignored. In another non-limiting embodiment, the non-vital message data may be processed based on whether the source processor has been selected by the separate processor 105.

Figure 10:
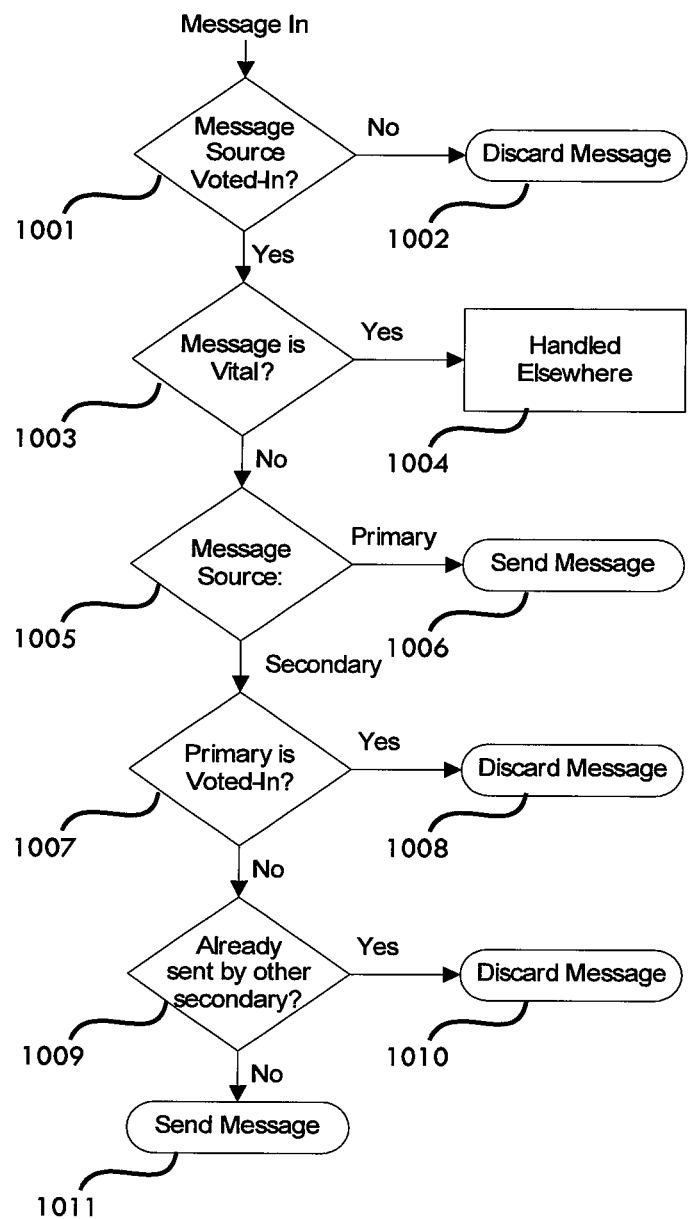
FIG. 10 illustrates a flow diagram for an embodiment of a system, method, and apparatus for processing non-vital message data according to the principles of the present invention.

Referring now to FIG. 10, a flow diagram for a method of handling non-vital message data is shown according to a preferred and non-limiting embodiment. At a first step 1001, it is determined whether the source processor that generated the received message data was selected or "voted-in." If not, the message data is discarded at step 1002. If the message data was selected, the method proceeds to step 1003 where it is determined whether the message data is vital. If the message data is vital, the method proceeds to step 1004 and the data is processed as discussed herein. If the message data is not vital, the method proceeds to step 1005. At step 1005, if the message source is a primary processor, the method continues to step 1006 and the message is transmitted. If the message source is a secondary processor, the method proceeds to step 1007 where it is determined if the primary processor was selected or "voted-in". If so, the method proceeds to step 1008 and the message data received from the secondary processor is discarded. If the primary processor was not selected or "voted-in", the method proceeds to step 1009 where it is determined if the non-vital message data was already sent by another secondary processor. If so, the method proceeds to step 1010 and the message data received from the secondary processor is discarded. Otherwise, the method proceeds to step 1011 and the non-vital message is transmitted.

Figure 11:
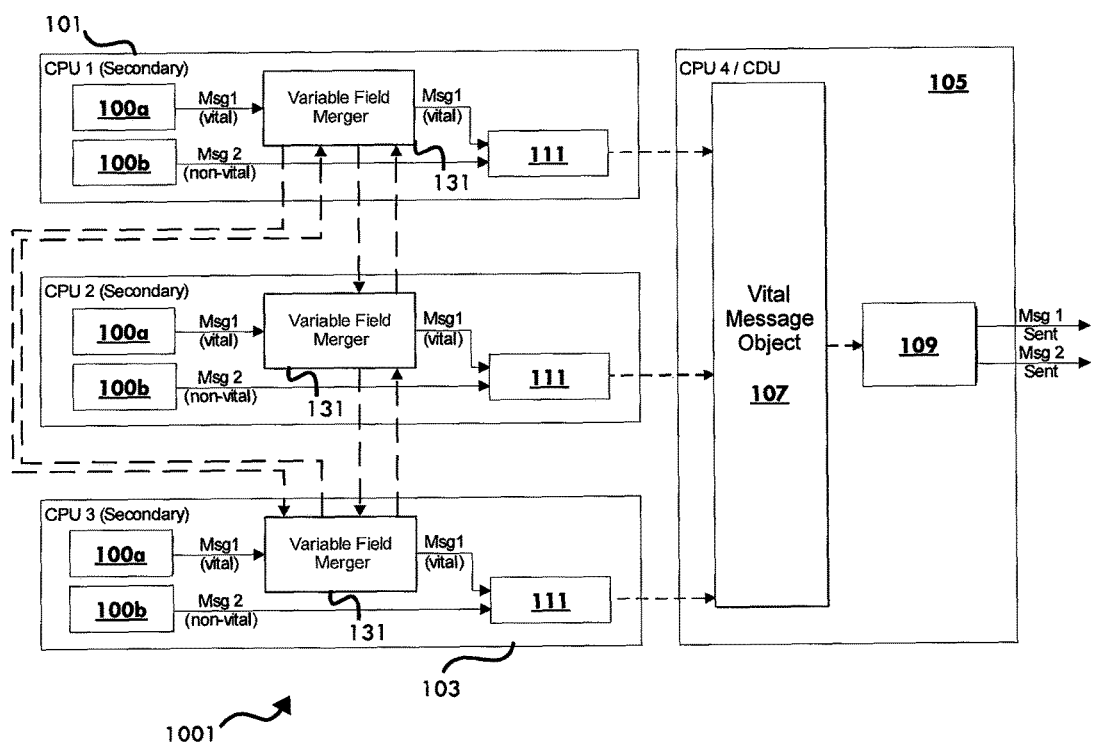
FIG. 11 illustrates a schematic diagram of an embodiment of a system for generating vital messages having variable fields on an on-board system of a rail vehicle according to the principles of the present invention.

In a non-limiting embodiment, messages with variable fields may be sent as vital messages. In such examples, the fields of a message may vary among processors. Such fields may include, but are not limited to, location (e.g., coordinates, landmarks, etc), time (e.g., seconds or other units), distances (e.g., distance traveled, distance to or from a location, etc), and fault data. With reference to FIG. 11, processors 101, 102, 103 may execute a variable field merger object 131. The architecture of the variable field merger object 131 may be similar to that of the vital message object 107 but, instead of being executed by the separate processor 105, resides and/or is executed by each of the other processors 101, 102, 103. The variable field merger object 131 may exchange message data and other information between the processors 101, 102, 103 via the User Datagram Protocol (UDP) or any other protocol. For example, the variable field merger object 131 may take input from each processor 101, 102, 103 and generate a message that is common between the processors 101, 102, 103. Each processor 101, 102, 103 may then communicate that message to the OTC object 111, and each processor 101, 102, 103 is enabled to send its message data to the separate processor 105 such that the message is processed according to the logical operations discussed herein.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A computer-implemented method of generating vital messages on an on-board system of a vehicle, comprising:
generating a plurality of vital messages with each processor of a plurality of different processors of the on-board system based on train data available to each processor;
transmitting the plurality of vital messages from the plurality of different processors to a separate processor;
generating, by the separate processor, a final vital message based on at least two vital messages of the plurality of vital messages;
determining that the final vital message is valid if the final vital message matches at least two vital messages of the plurality of vital messages; and
transmitting the final vital message to a remote system if the final vital message is determined to be valid.

2. The computer-implemented method of claim 1, wherein generating the final vital message comprises combining the plurality of vital messages such that any invalid messages are filtered out.

3. The computer-implemented method of claim 2, wherein the plurality of vital messages comprises at least a first vital message, a second vital message, and a third vital message, and wherein combining the plurality of vital messages comprises:
combining the first vital message with the second vital message using a first logical operator to generate a first binary string;
combining the first vital message with the third vital message using the first logical operator to generate a second binary string;
combining the second vital message with the third vital message with the first logical operator to generate a third binary string; and
combining the first binary string, the second binary string, and the third binary string with a second logical operator.

4. The computer-implemented method of claim 3, wherein the first logical operator is an AND operator, and the second logical operator is an OR operator.

5. The computer-implemented method of claim 1, further comprising:
determining, at the remote system, that the final vital message is valid based at least partially on a CRC.

6. The computer-implemented method of claim 1, further comprising:
adding a binary string to each vital message of the plurality of vital messages, wherein each binary string uniquely identifies the processor that generated the vital message, and wherein each binary string has at least one bit that is the same in every binary string of a plurality of binary strings; and
determining if the final vital message is valid by combining the plurality of binary strings to generate a combined identifier, such that the final vital message is valid if the combined identifier comprises the at least one bit.

7. The computer-implemented method of claim 6, further comprising determining if the combined identifier comprises the at least one bit by comparing the combined identifier to a predetermined value.

8. A system for generating vital messages on an on-board system of a vehicle, comprising:

a plurality of processors arranged in the vehicle and configured to generate a plurality of vital messages, each processor of the plurality of processors configured to generate at least one vital message of the plurality of vital messages based at least partially on safety-critical data available to that processor, wherein the plurality of vital messages comprises at least a first vital message, a second vital message, and a third vital message; and at least one separate processor configured to generate a final vital message by combining at least two vital messages of the plurality of vital messages by:
  combining the first vital message with the second vital message using a first logical operator to generate a first binary string;
  combining the first vital message with the third vital message using the first logical operator to generate a second binary string;
  combining the second vital message with the third vital message using the first logical operator to generate a third binary string; and
  combining the first binary string, the second binary string, and the third binary string using a second logical operator to generate a final binary string.

9. The system of claim 8, wherein the first logical operator is an AND operator, and the second logical operator is an OR operator.

10. The system of claim 8, wherein each vital message of the plurality of vital messages comprises a binary string that uniquely identifies the processor that generated the vital message, wherein each binary string for the plurality of vital messages comprises at least one bit that is the same in every binary string of the plurality of binary strings, and wherein the at least one separate processor is configured to combine the plurality of binary strings to generate a combined identifier, such that the final vital message can be validated by determining if the combined identifier comprises the at least one bit.

11. The system of claim 10, wherein the combined identifier is determined to comprise the at least one bit based on a comparison between the combined identifier and a predetermined value.

12. An apparatus for generating vital messages on an on-board system of a vehicle, comprising at least one non-transitory computer-readable medium including program instructions that, when executed by the on-board system, cause the on-board system to:
  generate a plurality of vital messages with each processor of a plurality of different processors of the on-board system based on train data available to each processor;
  transmit the plurality of vital messages from the plurality of different processors to a separate processor;
  generate, on the separate processor, a final vital message from at least two vital messages of the plurality of vital messages;
  determine that the final vital message is valid if the final vital message matches at least two vital messages of the plurality of vital messages; and
  transmit the final vital message to a remote system if the final vital message is determined to be valid.

13. The apparatus of claim 12, wherein the on-board system generates the final vital message by combining the plurality of vital messages such that invalid messages are filtered out or detectable as invalid.

14. The apparatus of claim 13, wherein the plurality of vital messages comprises a first vital message, a second vital message, and a third vital message, and wherein combining the plurality of vital messages comprises:

combining the first vital message with the second vital message with a first logical operator to generate a first binary string;
  combining the first vital message with the third vital message with the first logical operator to generate a second binary string;
  combining the second vital message with the third vital message with the first logical operator to generate a third binary string; and
  combining the first binary string, the second binary string, and the third binary string with a second logical operator.

15. The apparatus of claim 14, wherein the first logical operator is an AND operator, and the second logical operator is an OR operator.

16. The apparatus of claim 12, wherein the remote system determines that the final vital message is valid or invalid based on a CRC.

17. The apparatus of claim 12, wherein the on-board system is further caused to:
  add, to each vital message of the plurality of vital messages, a binary string of a plurality of binary strings, wherein each binary string of the plurality of binary strings uniquely identifies the processor that generated the vital message, and wherein each binary string has at least one bit that is the same in every binary string of the plurality of binary strings; and
  combining the plurality of binary strings to generate a combined identifier, such that the final vital message can be validated by determining if the combined identifier comprises the at least one bit.

18. The apparatus of claim 17, wherein a remote system determines if the combined identifier comprises the at least one bit by comparing the combined identifier to a predetermined value.

19. The apparatus of claim 12, wherein the plurality of messages comprises variable message fields, and wherein the on-board system is further caused to:
  exchange variable field data among the plurality of different processors, wherein each vital message of the plurality of vital messages is generated based at least partially on the variable field data.

20. A computer-implemented method for generating a vital message on an on-board system of a vehicle, comprising:
  inserting an identifier into each message of a plurality of messages, wherein at least a first portion of each identifier uniquely identifies a processor of a plurality of processors that generated the message, and wherein at least a second portion of each identifier is identical among all identifiers;
  combining, with at least one processor, the plurality of messages into a final message comprising a combined identifier;
  determining, with at least one processor, if the combined identifier comprises the second portion of each identifier; and
  determining, with at least one processor, that the final message was generated based on at least two messages from at least two processors if the combined identifier comprises the second portion.

21. The computer-implemented method of claim 20, wherein each message comprises a binary string, and wherein determining if the combined identifier comprises the second portion comprises determining if the first portion of a final identifier comprises 0-bits and if the second portion of the final identifier comprises 1-bits.

22. The computer-implemented method of claim 20, wherein each message comprises a binary string, and wherein combining the plurality of messages with the at least one logical operator comprises:
  combining each message and each other message of the plurality of messages with an AND operation, resulting in at least two results; and
  combining the at least two results with an OR operation.

23. The computer-implemented method of claim 22, further comprising determining if the final vital message is valid by comparing the final vital message to each message such that, if at least two messages of the plurality of messages match the final vital message, the final vital message is determined to be valid.

24. A system for generating and validating a vital message, comprising:
  at least one non-transitory computer-readable medium including program instructions that, when executed by an on-board system of a vehicle, cause the on-board system to:
    receive a plurality of messages, each message of the plurality of messages comprising an identifier, wherein at least a first portion of each identifier uniquely identifies a processor of a plurality of processors that generated the message, and wherein at least a second portion of each identifier is identical among all identifiers; and
    combine the plurality of messages into a final message comprising a combined identifier;
  at least one non-transitory computer-readable medium including program instructions that, when executed by a remote system, cause the remote system to:
    determine if the combined identifier comprises the second portion of each identifier; and
    determine that the final message was generated based on at least two messages from at least two processors if the combined identifier comprises the second portion.

25. The system of claim 24, wherein each message comprises a binary string, and wherein determining if the combined identifier comprises the second portion comprises determining if the first portion of a final identifier comprises 0-bits and if the second portion of the final identifier comprises 1-bits.

26. The system of claim 24, wherein each message comprises a binary string, and wherein the plurality of messages are combined by:
  combining each message and each other message of the plurality of messages with an AND operation, resulting in at least two results; and
  combining the at least two results with an OR operation.

27. The system of claim 24, wherein the remote system is further caused to determine if the final vital message is valid by comparing the final vital message to each message such that, if at least two messages of the plurality of messages match the final vital message, the final vital message is determined to be valid.

* * * * *